United States Patent

Takahashi et al.

[11] Patent Number: 5,299,351
[45] Date of Patent: Apr. 5, 1994

[54] CONTINUOUS PARTS FEEDER

[75] Inventors: Takao Takahashi; Hiroshi Takehara, both of Tokyo, Japan

[73] Assignee: Multifastener Corporation, Detroit, Mich.

[21] Appl. No.: 958,984

[22] Filed: Oct. 9, 1992

[30] Foreign Application Priority Data

Oct. 11, 1991 [JP] Japan .................. 3-292182

[51] Int. Cl.⁵ .............................. B23P 11/00
[52] U.S. Cl. ...................... 29/798; 470/167; 221/11; 29/716
[58] Field of Search .................. 29/716, 798, 432; 470/165, 167; 221/11; 414/403

[56] References Cited

U.S. PATENT DOCUMENTS

| | | |
|---|---|---|
| 3,140,010 | 7/1964 | Double . |
| 3,334,724 | 8/1967 | Steward . |
| 3,568,229 | 3/1971 | Moore et al. . |
| 3,759,418 | 9/1973 | Willson et al. ............ 221/157 |
| 3,823,803 | 7/1974 | Lubin ..................... 193/43 |
| 3,845,860 | 11/1974 | Ladouceur et al. ........ 206/338 |
| 3,858,299 | 1/1975 | Woods .................... 29/211 |
| 3,971,116 | 7/1976 | Goodsmith et al. ........ 29/208 |
| 4,442,584 | 4/1984 | Smallegan ............... 29/432 |
| 4,532,664 | 8/1985 | Steward et al. .......... 10/162 |
| 4,692,983 | 9/1987 | Kristola et al. ......... 29/798 |
| 4,765,057 | 8/1988 | Muller ................... 29/798 |
| 4,941,795 | 7/1990 | Elliott et al. ......... 221/11 |
| 4,949,833 | 8/1990 | Sakamoto et al. ........ 198/358 |

FOREIGN PATENT DOCUMENTS 0197909 10/1986 European Pat. Off. .
2613336 10/1988 France .
2067149 5/1980 United Kingdom .

Primary Examiner—Lowell A. Larson
Assistant Examiner—Michael J. McKeon
Attorney, Agent, or Firm—Howard & Howard

[57] ABSTRACT

This invention is intended to provide a continuous parts feeder capable of continuously feeding parts to a metal mold installed in a pressure machine such as a press.

An actual example of this invention consists of a parts transport pipe (40) that uses compressed air to feed parts, magazines (42, 44) that feed parts sequentially to this parts transfer pipe (40) with compressed air, and a coupling device (46) that can selectively switch the entrance of the parts transport pipe (40) between the outlets of at least two magazines (42, 44). It will also be equipped with an auxiliary compressed air supply device (57) that supplies auxiliary compressed air to the inside of the parts transport pipe according to information from the parts detector (56) which determines whether there are or are not parts inside the parts transport pipe (40), so that the transport of parts inside the parts transport pipe is performed smoothly. The coupling device (46) is automatically controlled by the automatic control device (48).

9 Claims, 8 Drawing Sheets

CONTINUOUS PARTS FEEDER

FIELD OF THE INVENTION

This invention concerns an apparatus to continuously supply self-attaching fasteners, such as pierce and clinch nuts, pierce form studs, and similar parts to a metal die set in a pressure application machine such as a press.

BACKGROUND OF THE INVENTION

Connecting parts such as pierce and clinch nuts and pierce form studs are used to fasten screws and bolts to parts made from steel plate or aluminum plate. The end faces of these connecting parts themselves may act like a punch piercing the steel or aluminum plate, and at the same time, the end face of each connecting part is sealed by the hole which it has punched out, and in this way the connecting part is fixed to the steel plate.

The popular method of driving connecting parts such as a pierce nuts into a steel plate is to supply pierce nuts between the top and bottom platens of a metal die set in a press machine, and drive the pierce nuts into the steel plate with a drive punch as the press ram is lowered.

The machine used to supply pierce nuts to the mold during this pierce nuts insertion process is a machine recorded as Japanese Patent Opening 1981-102437. This machine and the way it inserts pierce nuts are explained with reference to FIG. 11 of this application. The machine is composed of a magazine wound in a coil shape 1 and a pipe 2 linked by a metal clamp 4. The other end of the pipe 2 is connected to the mold by a metal clamp 6. The pierce nuts slide smoothly inside the magazine 1 and the pipe 2, and air pressure applied from the other end of magazine 1 transports the pierce nuts through magazine 1 and pipe 2 in the direction of metal clamp 6 and supplies them to the metal mold. The supply of pierce nuts to the metal mold is performed continuously, synchronized with the vertical motion of the press ram K.

When pierce nuts are transported in the magazine 10 by the pressure of compressed air commonly available in factories (5 to 6 kilograms per square centimeter), a maximum of 2,000 pierce nuts can be placed in the magazine 10. This means that when an existing pierce nut feeder is used, after every 2,000 shots, the press is stopped while the operator real aces the empty magazine with one filled with pierce nuts.

When, for example, pierce nuts are inserted on a transfer press equipped with metal molds for 10 processes, every minute, the press machine produces 40 products which have undergone the 10 processes, which means that the 2,000 pierce nuts in a single magazine are exhausted in 50 minutes. Therefore, every 50 minutes, the transfer press must be shut down and an operator has to stop his other work to quickly replace the empty magazine. Transfer presses, now larger, faster, and more expensive than in the past, must be shut off frequently, further reducing their operating rates.

This invention is intended to provide a continuous parts feeder that permits continuous transfer press operation by automatically switching from an empty magazine to a new magazine filled with parts. It is also intended to provide a continuous parts feeder that guarantees smooth parts transport when the magazines are switched over.

SUMMARY OF THE INVENTION

This invention which achieves the aforementioned objectives is an installation apparatus having a continuous parts feeder that continuously feeds parts to the parts receiving area of a press used to insert parts, such as pierce or clinch nuts and pierce form studs to work pieces. The ideal operating configuration for this invention is a continuous parts feeder consisting of a parts transport tube or pipe within which parts are fed by compressed air, at least two magazines which transport parts inside the magazine to the magazine outlet sequentially by means of compressed air, a coupling device or selector valve which can switch over to selectively link the parts transport pipe entrance to the outlet of one of the magazines, a parts detector that can detect whether there are or are not parts inside the tube, and an auxiliary compressed air supply device to supply compressed air inside the parts transport tube.

When the parts stored inside the magazine that is connected to the parts transport tube have all been ejected, emptying the magazine, and as a consequence, the parts detector determines that there are no more parts, the auxiliary compressed air device is turned on to supply auxiliary compressed air to the inside of the parts supply tube at the same time as the supply of compressed air to the magazine linked to the parts supply pipe is cut off. The coupling device or selector valve is activated to disconnect the entrance of the parts transport pipe from the outlet of the empty magazine and connect it to the outlet of the new magazine filled with parts. At the same time as compressed air is supplied to the interior of the new magazine filled with parts, the auxiliary compressed air supply device is shut off.

With this continuous parts feeder, when the entrance to the parts transport pipe is being automatically connected to the outlet of the new magazine, parts still in the parts transport pipe are smoothly transported without interruption to the parts transport pipe exit by the auxiliary compressed air supplied by turning on the auxiliary compressed air supply device. The supply of parts to the press machine is, therefore, not interrupted. Also, after the parts transports tube entrance is automatically switched over and connected to the new magazine outlet, the auxiliary air supply is cut off, but compressed air is supplied to the parts transport tube from the compressed air outlet in the new magazine through the interior of the magazine, so that the parts within the magazine are fed to the parts transport tube. The parts are, consequently, supplied continuously to the parts receiving area of the press machine through the parts transport tube outlet. As a result, the transfer press or similar machine can operate continuously without being shut off, so that it can display its inherent performance and provide improved operating rates.

BRIEF DESCRIPTION OF THE DRAWINGS

Below is a detailed explanation of this invention is provided with reference to the enclosed drawings that show an actual working example of this invention.

DESCRIPTION OF THE PREFERRED EMBODIMENT

Figure 1:
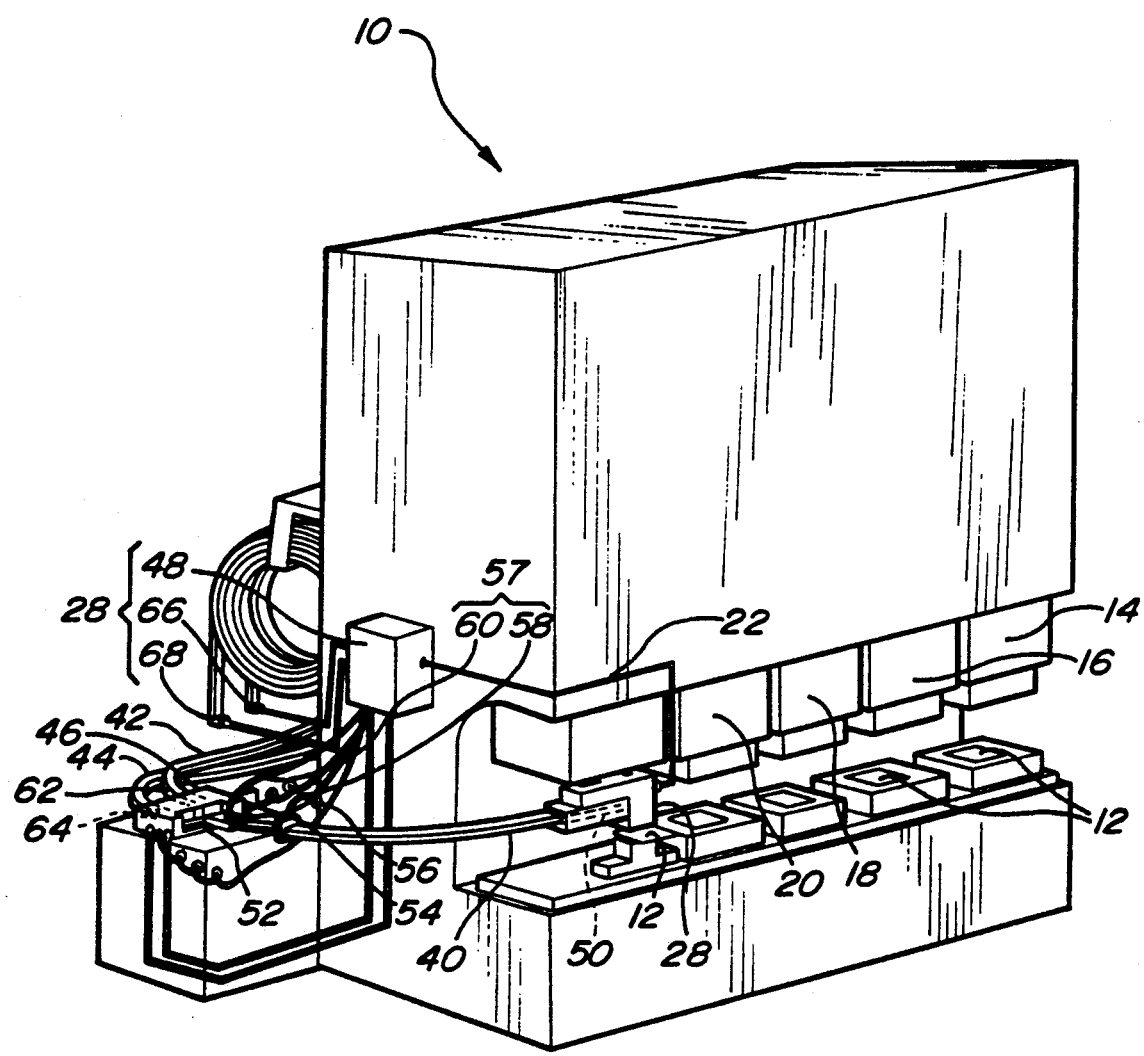
FIG. 1 is a perspective view showing the general structure of a transfer press equipped with this invention, the continuous parts feeder.

FIG. 1 is a perspective drawing showing an outline of a transfer press used to manufacture steel plate products such as automobile parts (brackets for example). Each metal mold or set of die platens preforms a different process including shearing, bending, or pressing to the steel plate. One of these, the pierce nut insertion press, inserts pierce nuts into the products. This invention, the continuous parts feeder may be used to continuously feed pierce or clinch nuts into this nut insertion press.

Figure 3:
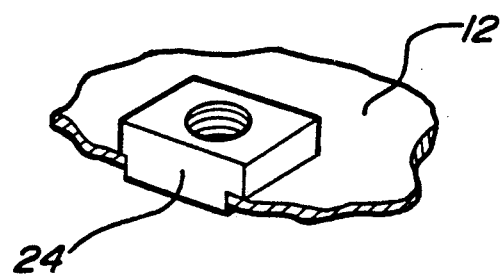
FIG. 3 is a partial cross-sectional view showing how a pierce nut is attached to a steel strip.

As shown in FIG. 1 the steel plates flow as follows. In transfer press 10, steel plates 12 are fed sequentially between the presses from right to left by a transport robot (not shown in the figure) as each of the individual presses (14 to 20) presses the steel plate to form it for a specific purpose. Press 14 for example shears the steel plate, press 16 presses it, while presses 18 and 20 bend the steel plate. Pierce nuts are inserted into the steel plate by the pierce nut insertion press 22. FIG. 3 shows the way in which pierce nuts may be inserted into the steel plate. A pierce nut 24 is inserted into the steel plate 12 and sealed by the self-attachment method.

Figure 2:
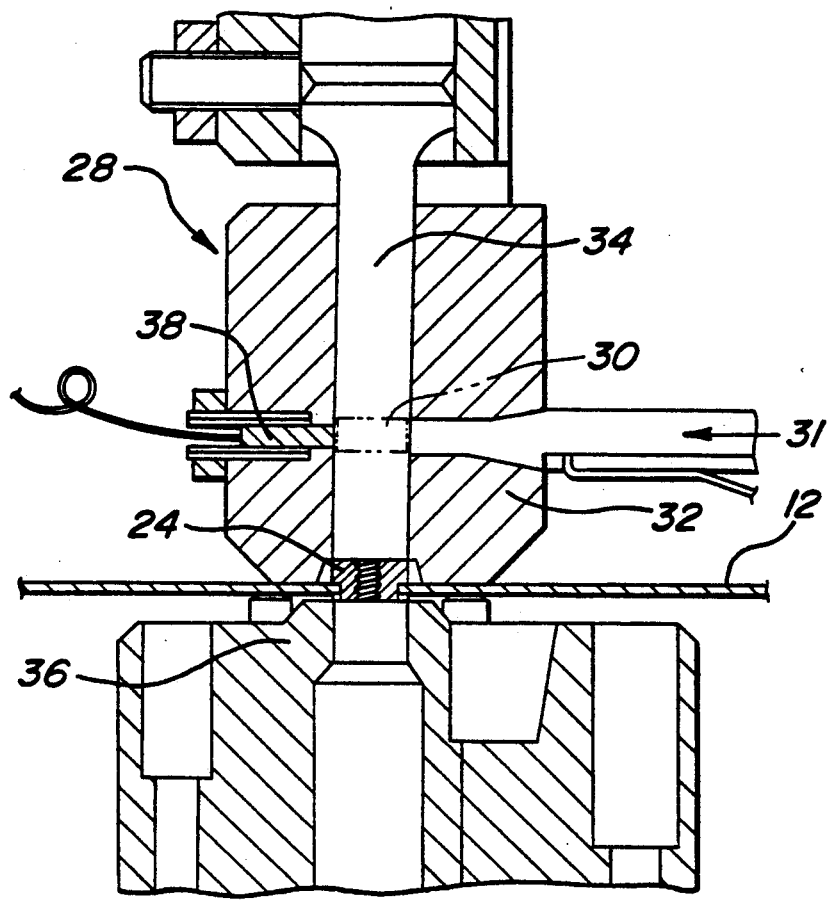
FIG. 2 is a part cross-section drawing of the installation head and the parts receiving area.

To briefly explain the procedure up to the insertion of pierce nuts 24 into steel plate 12 referring to FIGS. 1 and 2, the installation head 28 guides the pierce nuts 24 to steel plate 12. The continuous parts feeder 26 continuously feeds pierce nuts 24 into the parts receiving area 30 of the head 28 in the direction indicated by the arrow 31. The pierce nut installation head 28 is equipped with a nose 32 that fixes the steel plate 12 that has been fed to the prescribed position from press 20 that performs the previous operation, a plunger 34 that drives pierce nuts 24 against the steel plate 12, through the nose 32, and inserts the pierce nuts into the steel plate, and a die button 36 that supports the steel plate 12 and strengthens the insertion of pierce nuts 24. A feature not shown in the figures is the finger attached to the head 28 that holds the pierce nuts 24 that have been transported to the parts receiving area 30.

A proximity sensor 38 is usually installed beside the parts receiving area 30 to detect whether or not there is a pierce nut 24 in the parts receiving area. The press operates, and the plunger 34 comes down and inserts a pierce nut 24 in the steel plate 12 only when the proximity sensor 38 indicates that there is a pierce nut in the parts receiving area 30. When, on the other hand, the proximity sensor 38 does not detect the presence of a pierce nut 24, the plunger 34 does not move and the pierce nut insertion press 22 shuts down in order to prevent the press from omitting a pierce nut. As a result the entire transfer press 10 also shuts down.

FIG. 2 also shows the situation when one pierce nut 24 is inserted into each steel plate, but generally, a number of pierce nuts are inserted in every steel plate, and in these cases it is necessary to attach multiple heads equal in number to the number of pierce nuts that are inserted.

A suitable embodiment of the continuous parts feeder of this invention is shown in FIG. 1 and in FIGS. 4 to 7. FIG. 1 is a slightly expanded example of this continuous parts feeder attached to pierce nut insertion press 22. The continuous parts feeder 26 consists of parts transport or feed tube 40 connected to the head 28 so that it can supply pierce nuts 24 to head 28, two magazines 42 and 44 that replenish the stock of pierce nuts 24 in the parts transport or feed tube 40, the coupling device or selector valve 46 that is able to switch in order to selectively link the parts transport or feed tube 40 to either magazine 42 or magazine 44, and the automatic control device 48 that automatically controls the action of the selector valve 46.

The pierce nut exit 50, which can be linked to the parts receiving area 30, is on one end of the parts transport tube 40, while the entrance or inlet 52, where pierce nuts are inserted, is on the other end of the parts feed tube. The detection position 54, which is preferably near the entrance 52 of the parts feed tube 40, is the location of the parts detector device such as a magnetic sensor 56 that detects the presence or absence of a pierce nut inside the feed tube. The coupler 58 on the auxiliary compressed air supply device 57 that supplies compressed air inside the feed tube is installed between the entrance 52 and the magnetic sensor 56. The auxiliary compressed air supply device 57 is linked to a solenoid valve (not shown) and to a vinyl tube 60 that brings compressed air from the factory's compressed air supply system.

Exits 62 and 64 at the ends of the transfer tubes of the two magazines 42 and 44 respectively, are connected to the coupling device 46, and the pierce nuts inside the magazines are fed to the parts feed tube 40 by selectively linking either outlet 62 or 64 to the entrance 52 of the parts feed tube 40. This transport operation is performed by compressed air from either compressed air outlets 66 or 68 in the opposite ends of the magazines.

It is possible to use a general purpose programmable controller available on the market as the automatic control device 48, but it can also be manufactured from integrated circuits. The automatic control device 48 controls the auxiliary compressed air supply device 57 that supplies compressed air inside the parts transport pipe, and the compressed air supply device (not shown in the diagrams) that provides compressed air to the magazine compressed air inlets 66 and 68, and the coupling device 46.

Figure 4:
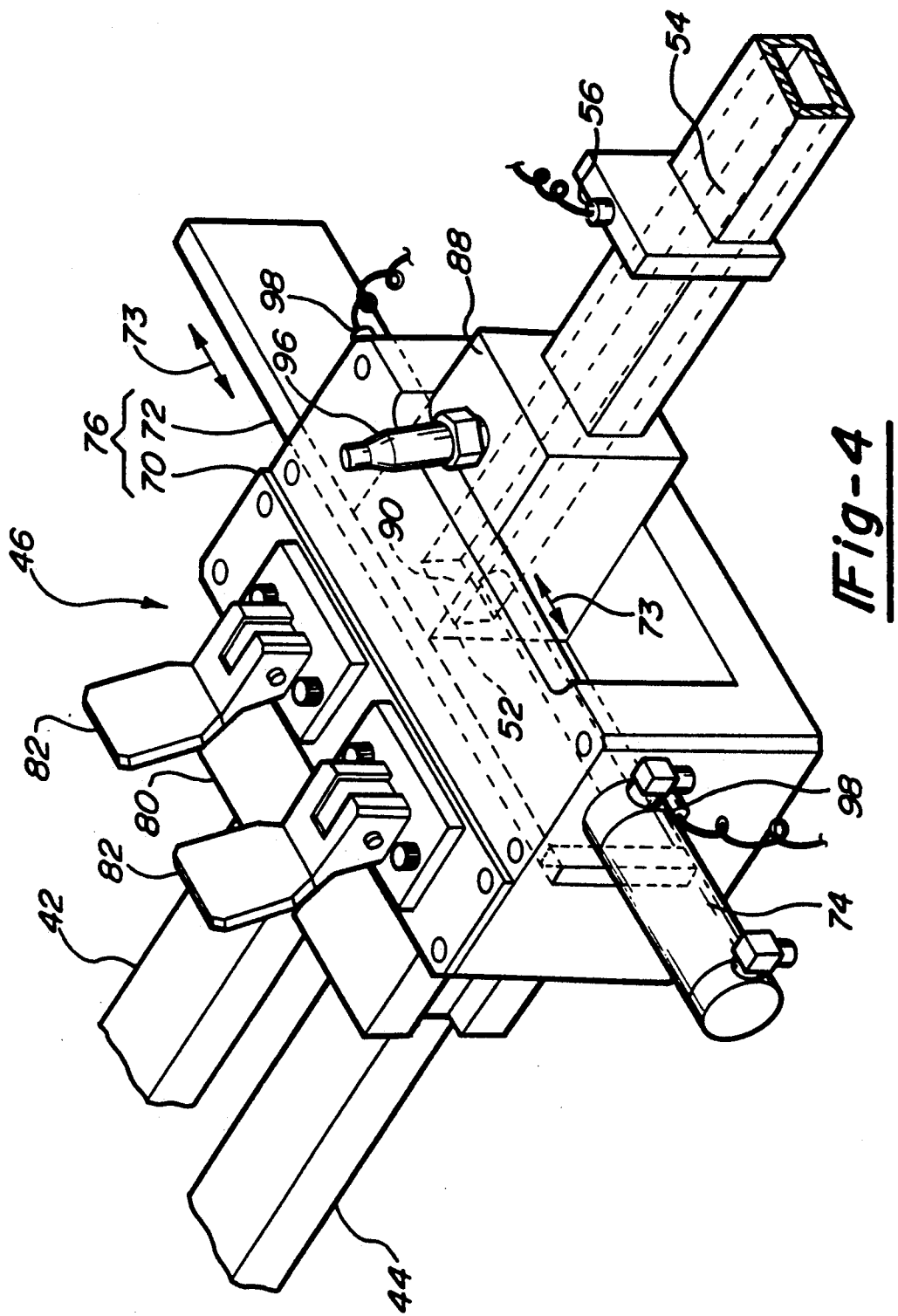
FIG. 4 is a perspective view of the coupling device from the side of the parts transport pipe.
Figure 5:
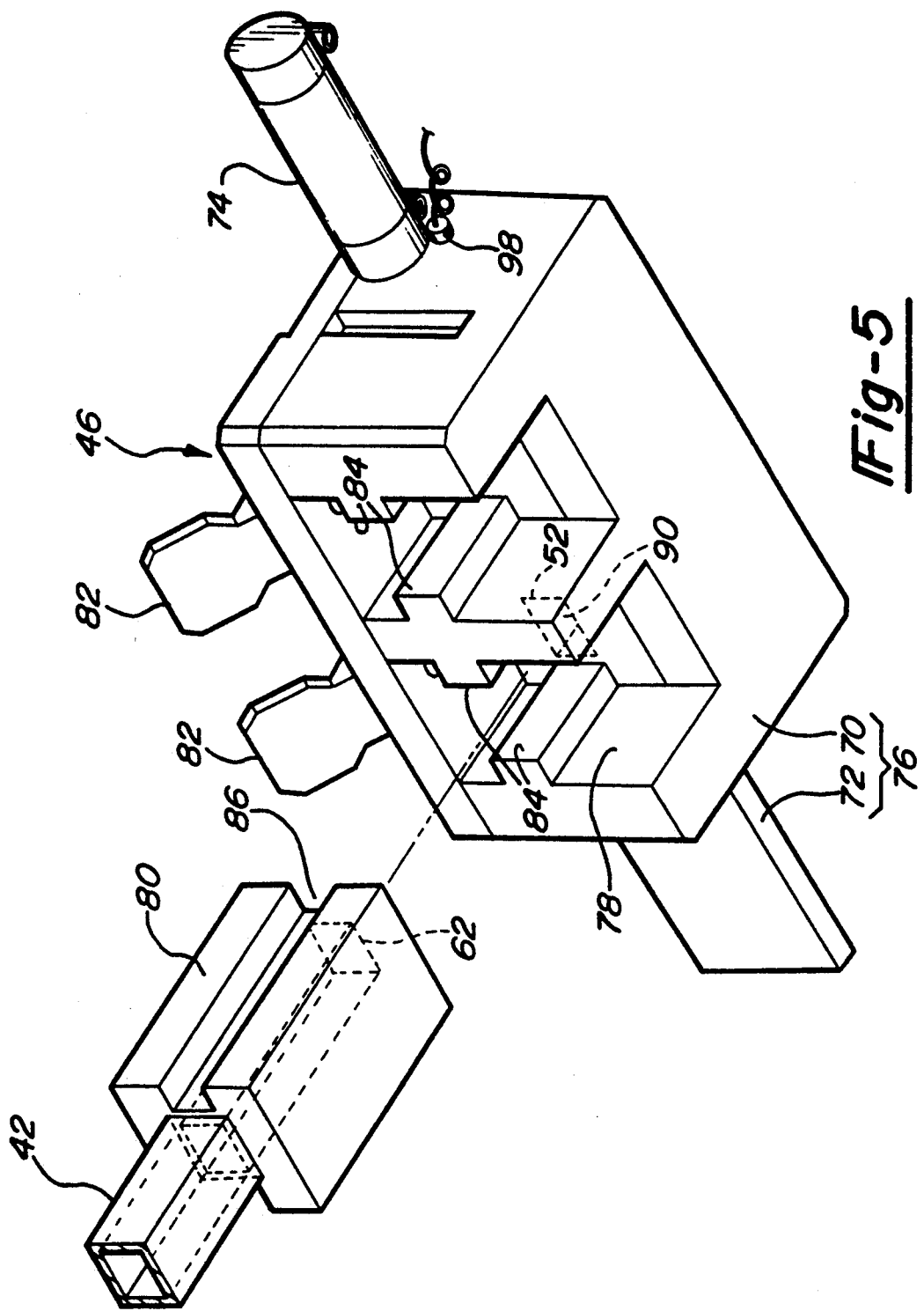
FIG. 5 is a perspective view of the coupling device shown in FIG. 4 from the side of a magazine.
Figure 6:
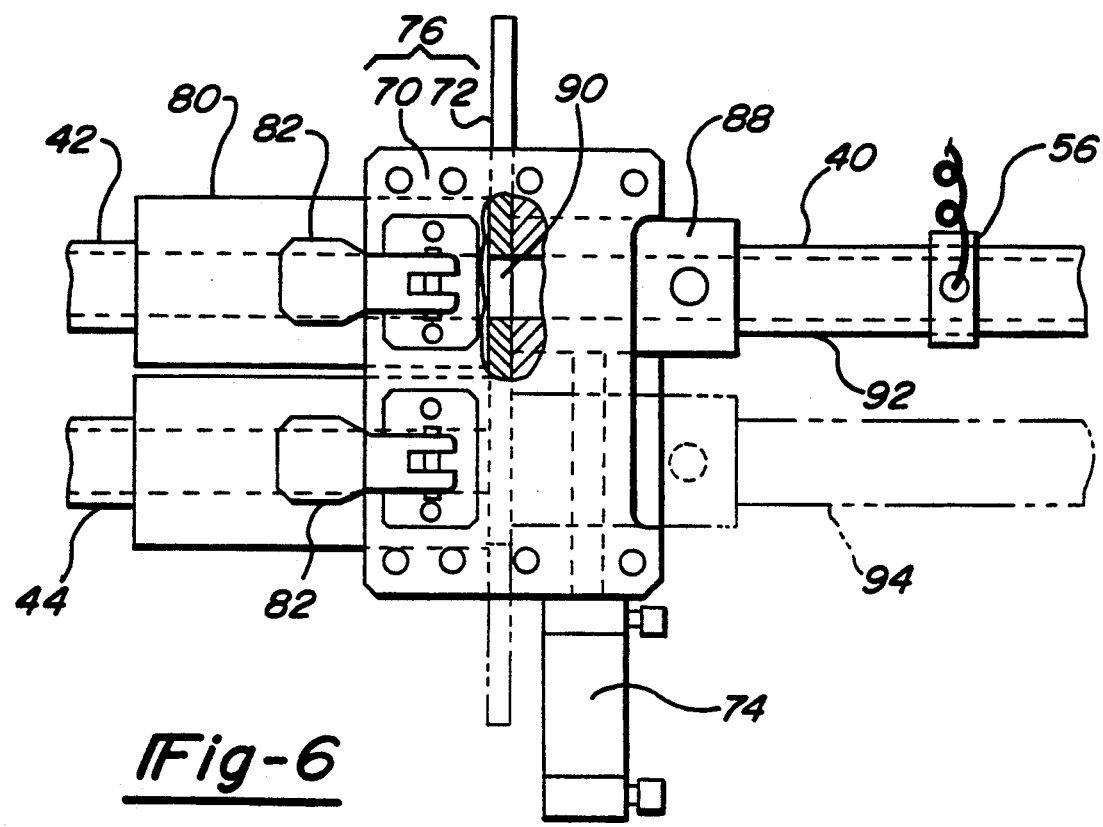
FIG. 6 is a top plane view of the coupling device shown in FIG. 4.
Figure 7:
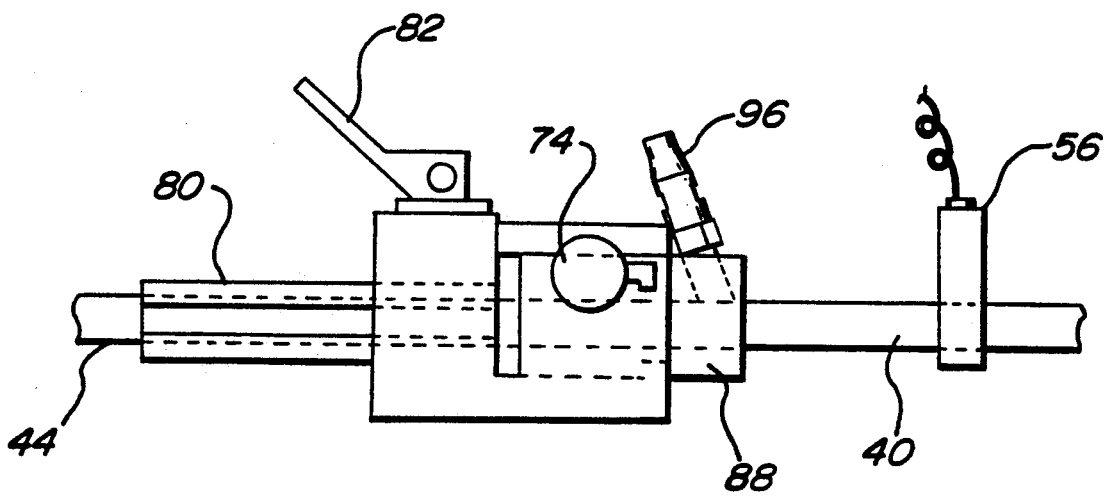
FIG. 7 is a side view of the coupling device shown in FIG. 4.

FIGS. 4 to 7 illustrate one embodiment of the parts transfer valve 46. FIG. 4 is a perspective drawing of the coupling device or transfer valve from the side of the parts transfer tube entrance; FIG. 5 is a perspective drawing of the coupling device from the side of the magazine outlet, FIG. 6 is a plane view of the coupling device, and FIG. 7 is lateral view of the coupling device. This coupling device 46 consists of stationary housing 70 to which the magazines can be freely attached or detached, a slide valve plate 72 that operates in concert with the stationary housing 70, and an air cylinder 74 that moves the slide valve disk in the direction indicated by the arrow 73. The housing 70 and the slide valve plate 72 form the slide type magazine transfer valve 76.

As FIG. 5 indicates, an attachment block 80 is installed at the magazine outlet 62 to connect the magazine 42 to the magazine outlet connecting opening 78 of housing 70. This attachment block 80 is penetrated by magazine 42. When this attachment block 80 is inserted into magazine outlet connecting opening 78, magazine outlet 62 is connected to coupling device 46. So that the transfer tube of coupled magazine 42 will not easily slip out of place, a protrusion 84 installed on the magazine outlet connecting opening 78 is structured to fit inside the groove 86 on the attachment block 80. This coupling is performed by the magazine mounting and dismounting lever 82.

As FIG. 4 indicates, the slide valve plate 72 can be moved in the direction indicated by the arrow 73 by the action of an actuator, such as the air cylinder 74, so that either magazine outlet 62 or 64 of the two connected magazines can be selectively linked to the entrance 52 of the parts transport tube. The slide valve plate 72 may be welded to the attachment block 88 that is itself connected to the entrance 52 of the parts transport tube. An opening 90 that permits the passage of pierce nuts is cut in the slide valve plate 72 at the part that is attached to the attachment block 88, and parts transfer tube 40 penetrates attachment block 88 and opening 90. The slide valve plate 72 is moved in the direction indicated by arrow 73 by the air cylinder 74, and where the attachment block 89 attached to the side valve plate 72 adheres to the stationary material 70, the transfer tube of magazine outlet 62, and parts pipe transport entrance 52 are connected so that pierce nuts can pass through them. At this time, magazine outlet 64 is sealed by the slide valve plate 72. As FIG. 6 shows, the connection is switched by moving parts transport tube 40 from the position shown by the solid line 92, to the position shown by the 2-dot & 1-dash line 94 (FIG. 6 shows it when it is switched from the transfer tube of magazine 42 to magazine 44.) The parts feed tube 40, is preferably formed from flexible plastic so that it can bend freely with the action of the slide valve plate 72.

A coupler 96 is installed on the attachment block 88 at the entrance 52 of the feed tube. Auxiliary compressed air is passed through this coupler to the inside of parts transport tube 40. As already mentioned, a magnetic sensor 56 is installed. So that there will be sufficient pierce nuts left in the parts transport tube 40 when magazine switch over occurs, the coupler 96 is preferably as close as possible to the entrance 52 of the parts feed tube 40. For the same reason, the magnetic sensor 56 should be close to the entrance of the parts transport tube.

With the continuous parts feeder 26 shown in this example, the supply of compressed air from magazine compressed air inlets 66 and 68 is controlled by the automatic control device 48 so that compressed air is supplied only to the magazine connected to the parts transport or feed tube 40, but compressed air may also be supplied continually to the two magazines. This approach simplifies the structure, and reduces the cost of manufacturing the feeder. A proximity sensor 98 may also be installed to confirm that the slide valve plate 72 is moving correctly.

The example consists of two magazines connected to the feeder, but it can be designed to use more than two magazines at the same time by providing more than two linked magazine outlet openings. It is also possible to use an oval shaped slide type magazine selector valve, and construct the device so that it switches magazines by rotating the entrance of the parts transport pipe. If the device is structured in this manner, it is possible to attach many magazines to the stationary material which provides the operation with additional leeway.

Also, if the feeder is equipped so that after the magazines have switched over, a buzzer or emergency light informs the operator that the magazines have automatically switched, the operator can remove the empty magazine from the coupling device and attach another one that has already been filled with parts to the coupling device so that he will not have to check on the feeder until the next time he hears the buzzer.

Figure 8:
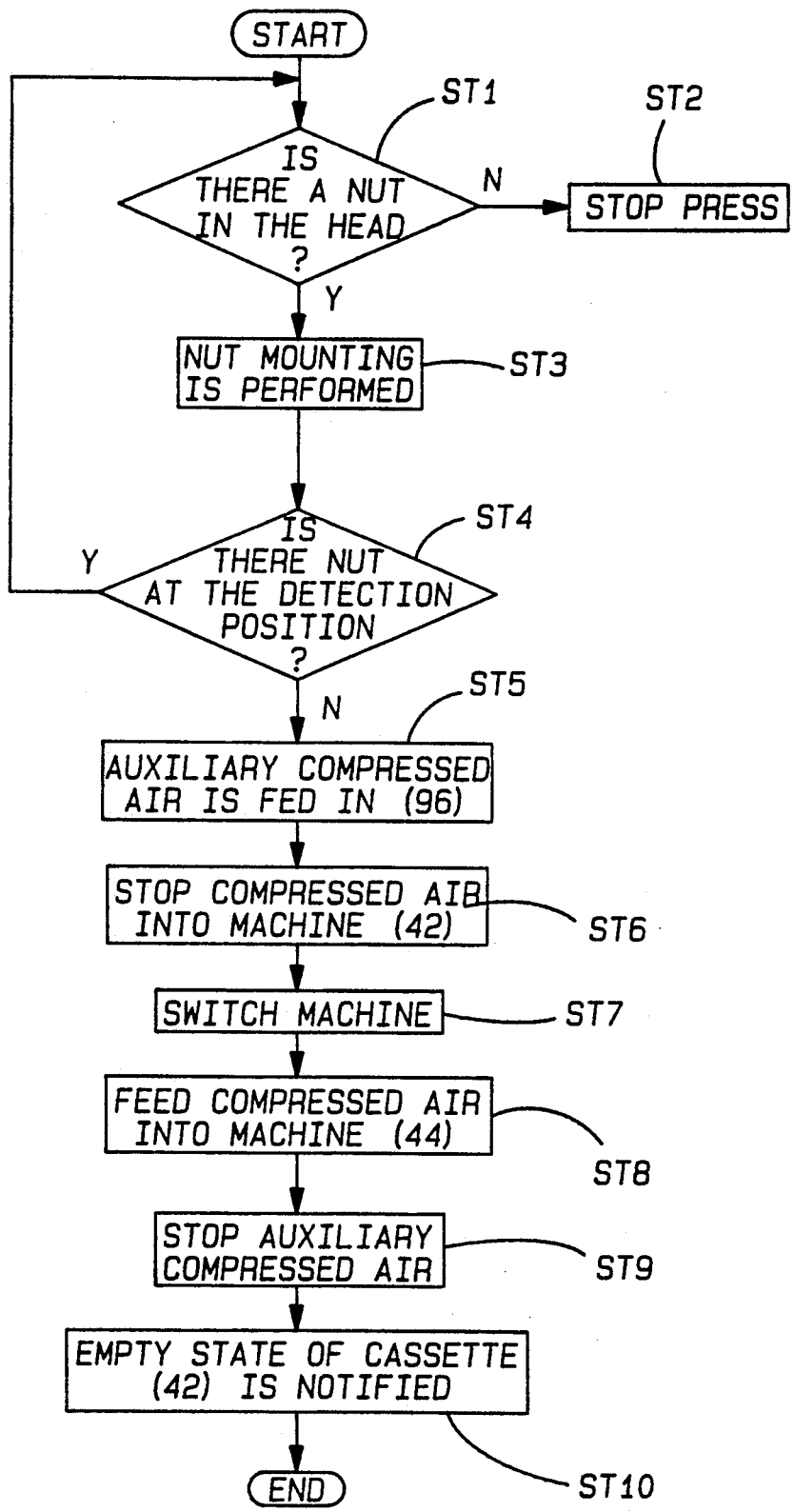
FIG. 8 is flow chart showing the preferred operation of this invention, the continuous parts feeder.

The preferred operation of this invention, the continuous parts feeder 26, is illustrated by the flow chart in FIG. 8 and by FIGS. 2 and 4. First the proximity sensor 38 determined whether or not a pierce nut is supplied to the head 28 (STI). When a piece nut has not been supplied to the head, the pierce nut insertion press 22 stops in emergency stop mode (ST2). When a pierce nut has been supplied to the head, pierce nut insertion occurs (ST3). The magnetic sensor 56 determines whether or not there is a pierce nut at detection position 54 (ST4). If there is a pierce nut at the detection position 54, it returns to operation STI when there is no pierce nut at detection position 54, the automatic control, device 48 activates the auxiliary compressed air supply device 46, and compressed air is supplied to the inside of parts supply or feed tube 40 from the coupler 96 (ST5). Next the supply of compressed air to magazine 42 that is connected to the parts supply tube 40 is cut off (ST6). Next, the action of air cylinder 74 disconnects the parts supply tube 40 from the empty magazine 42, and connects it to the magazine 44 that is filled with pierce nuts (ST7). Next compressed air is supplied to the inside of magazine 44 from the magazine compressed air inlet 68 (ST8). Next, the supply of auxiliary compressed air is cut off (ST9). Next a buzzer or emergency light (not shown in the diagrams) is turned on to let the operator know that magazine 42 is empty (ST10).

The operator, who has been alerted to the fact that magazine 42 is empty, removes empty magazine 42 from the stationary housing 70, fills the magazine 42 with pierce nuts, and reattaches it to housing 70, or else attaches another magazine that is already filled with pierce nuts to the stationary material. After that, the operator presses the reset button so that the same series of operations described above will be repeated.

In FIGS. 4 and 8, the compressed air supplied from coupler 96 is used as an auxiliary supply, but it is also acceptable for coupler 96 to supply compressed air all the time. In this case, when the parts detector indicates that there is no part at detection position 56 because the parts inside the magazine connected to the parts feed tube 40 have all been transported so the magazine is now empty, the coupling device is switched over so that the entrance to the parts transport pipe 40 is disconnected from the outlet of an empty magazine and coupled to the outlet of a new magazine which is filled with parts at the same time as the compressed air supply from the compressed air outlet in the empty magazine is stopped and the compressed air outlet in the new magazine that is filled with parts begins to supply compressed air. It is possible to use a limit switch and a sensor that operate In conjunction with the action of the attachment block 38 to switch the compressed air supply between the compressed air out lets of the magazines.

Figure 9:
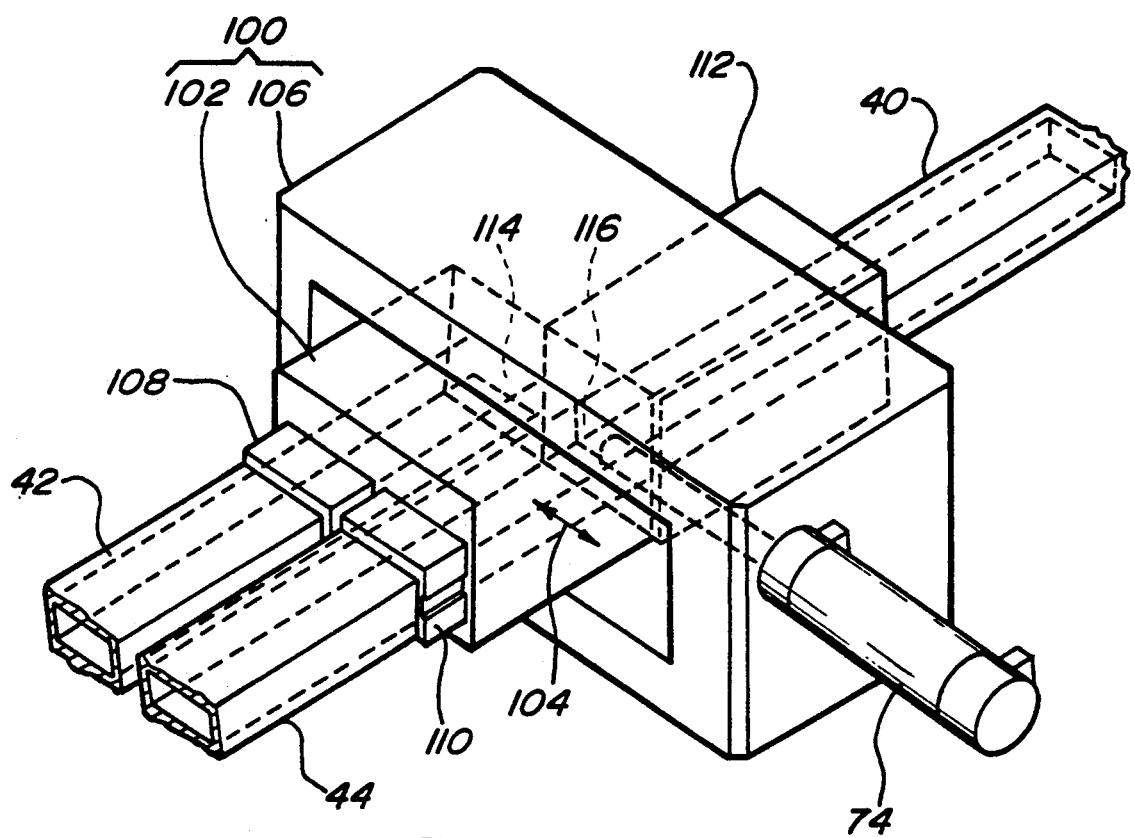
FIG. 9 is a perspective view showing a second embodiment slide type magazine selector valve.

Next, FIG. 9 illustrates another embodiment of the slide type magazine selector valve. This figure, however, is not the same as the that of the slide type magazine selector valve shown in FIG. 4. With the slide type magazine selector valve 76 shown in FIG. 4, the entrance to the parts transport pipe is connected to the slide valve plate, so that it moves with the slide valve plate, but with the slide type magazine selector valve 100 shown in FIG. 9, transfer tubes of magazines 41 and 44 are connected to the slide valve disk 102, and it is designed so that they are moved by the air cylinder in the direction indicated by the arrow 104 in concert with the slide valve plate 102. The stationary housing 106 is, therefore, linked to the parts transport tube 40.

Attachment blocks 108 and 110 are installed at the outlets of magazines 42 and 44 respectively, and they can be attached to or detached from the slide valve plate 102. These attachment blocks 108 and 110, penetrate the slide valve plate 102, and magazines 42 and 44 penetrate these attachment blocks 108 and 110. The outlets of magazines 42 and 44 coincide with openings 114 and 116 respectively that are cut in the slide valve plate.

Attachment block 112 is installed at the entrance or inlet to the parts transport or feed tube 40, and the parts feed tube 40 penetrates this attachment block 112. This structure means that the entrance to the feed tube 40 is connected to the outlet of either magazine 42 or magazine 44. Also with the slide type magazine selector valve 76 described above, the outlet of the magazine not in use is closed by the slide valve plate, but with this slide type magazine selector valve 100, the housing 106 closes the outlet of the valve that is not in use.

Figure 10:
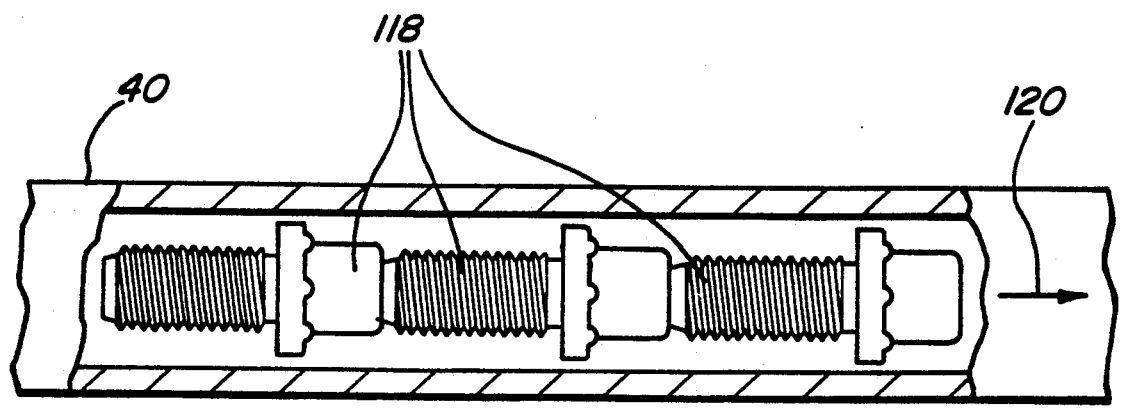
FIG. 10 is a partially cross-section view showing the condition of the feeder when it is feeding pierce form studs.
Figure 11:
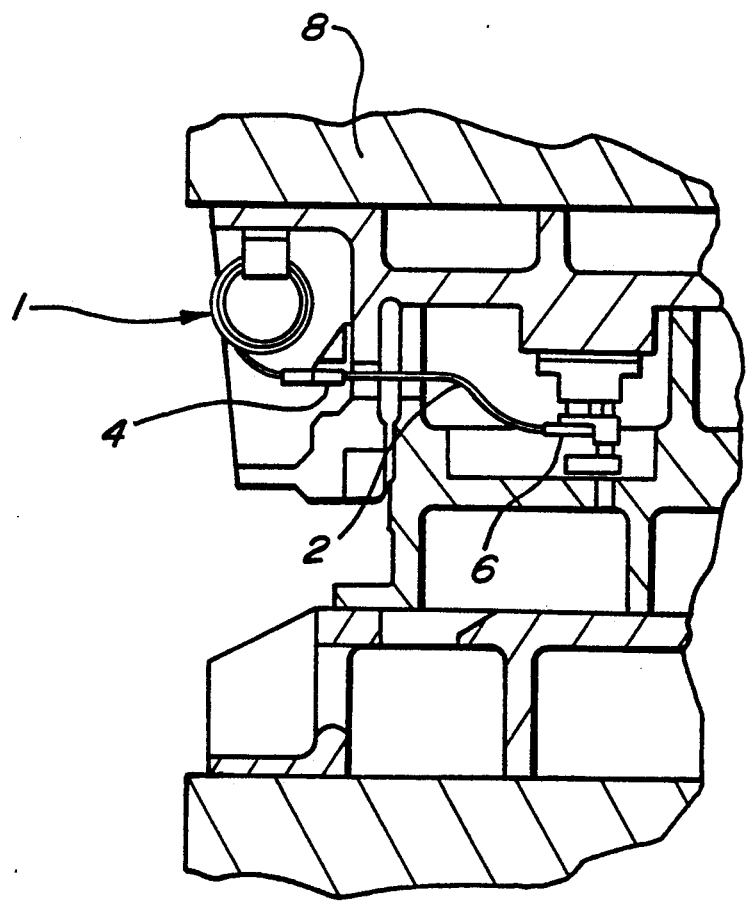
FIG. 11 is a schematic explanatory drawing of existing technology.

Next, FIG. 10 shows how pierce from studs are transported. The pierce form studs 118 are lined up in the feed tube 40 (or the transfer tubes of magazines 42 and 44) so they are fed in the pierce form stud axial direction and transported in the direction indicated by arrow 120 by compressed air.

When the continuous parts feeder presented in this actual example is installed on a parts insertion press such as a pierce nut insertion press, it can supply parts continuously because whenever there are no more pierce nuts in a magazine during machine operation, the feeder automatically selects a new magazine that is filled with pierce nuts. Because a buzzer or emergency light then informs the operator that he must replace a magazine, he need not periodically check on the magazines as in the past, and can carry on with other work without any need to worry that the feeder has run out of pierce nuts or other parts. Also, because magazine selection is not performed by the operator as in the past, but mechanically at high speed, there should be no more human errors.

By installing this continuous parts feeder to one section of a transfer press, it is possible to end transfer press emergency down time caused by magazines running out of parts, permitting the transfer press to display its full performance potential.

As this explanation has clearly shown, this invention is designed so that when one of at least two magazines runs out of parts, the parts feed tube automatically switches from the empty magazine to a new magazine that is filled with parts, so that as long as parts are supplied by the new magazine, it is possible to continuously operate the parts insertion press. Also when magazine switch-over occurs, compressed air is supplied to the inside of the parts feed tube by the auxiliary compressed air supply device so that smooth parts feeding is performed inside the parts feed tube.

We claim:

1. An installation apparatus for installing fasteners having a continuous feed system, said installation apparatus including a fastener installation head having an inlet receiving said fasteners for installation by said head, a feed tube having an inlet and an outlet in communication with said installation head inlet, a source of fasteners and a continuous feed system feeding said fasteners from said source of fasteners to said feed tube inlet, said continuous feed system comprising:

a feed selector valve having an outlet communicating with said feed tube inlet, at least two sources of said fasteners, each source including a transfer tube having an outlet communicating with said feed selector valve, with an outlet of one of said transfer tubes in communication with said feed tube inlet, said feed and transfer tubes each having an enclosed internal passage configured to receive and transfer said fasteners;

a sensor means adapted to sense the presence or absence of fasteners in said feed tube, said feed selector valve having a transfer means adapted to alternatively provide communication between one of said transfer tube outlets and said feed tube when said sensor means senses an absence of fasteners in said feed tube;

a source of pneumatic pressure communicating with each of said transfer tubes and said feed tube to direct said fasteners through said tubes toward said installation head; and a control means sequentially directing pneumatic pressure into one of said transfer tubes, then into said feed tube when said sensor means senses the absence of fasteners in said feed tube, and finally into a second feed tube following operation of said transfer means.

2. The installation apparatus as defined in claim 1, characterized in that said feed selector valve moves said feed tube relative to said cassette transfer tubes to alternatively establish communication between said feed tube inlet and said one of said cassette transfer tube outlets.

3. The installation apparatus defined in claim 1, characterized in that said feed tube is formed of a flexible plastic.

4. A continuous feed system for an installation apparatus used for installing self-attaching fasteners, said installation apparatus including a fastener installation head having an inlet receiving said self-attaching fasteners for installation by said head, an enclosed feed tube having an inlet and an outlet in communication with said installation head inlet, said continuous feed system including at least two cassettes normally filled with said self-attaching fasteners each having an outlet in communication with a selector valve with one of said cassette outlets in communication with said feed tube inlet, a sensor means adapted to sense the presence or absence of self-attaching fasteners in said feed tube, said feed tube selector valve having a shuttle means adapted to relatively move said feed tube inlet from communication with one of said cassette outlets to communicate with an outlet of a second cassette when said sensor means senses an absence of said self-attaching fasteners in one of said cassette outlets, a source of pneumatic pressure communicating with each of said cassettes and said feed tube to direct fasteners through said tubes towards said installation head; and a control means sequentially directing pneumatic pressure into said one of said cassettes, then into said feed tube when said sensor means senses the absence of self-attaching fasteners, and finally into a second cassette following operation of said shuttle means.

5. The installation apparatus for installing fasteners as defined in claim 1, characterized in that said feed selector valve includes a body having at least two inlets, each of said transfer tube outlets having a end configured to be received in one of said feed selector valve inlets in communication with a passage in said valve body, and a quick connect locking device releasably securing said transfer tube outlet end in said valve body inlet.

6. The installation apparatus for installing fasteners as defined in claim 5, characterized in that said feed tube inlet is connected to said transfer means and said feed selector valve having a piston moving said feed tube from a first position in communication with one of said transfer tube outlets to a second position in communication with a second transfer tube outlet.

7. The continuous feed system for an installation apparatus as defined in claim 4, characterized in that said selector valve has a body portion including at least two inlets, each of said transfer tube outlets having an end configured to be received in one of said selector valve inlets in communication with a passage in said valve body and a quick connect locking device releasably securing said transfer tube outlet ends in said valve body inlet.

8. The continuous feed system for an installation apparatus as defined in claim 19, characterized in that said feed tube inlet is connected to said shuttle means and said feed selector valve having a piston moving said feed tube from a first position in communication with one of said transfer tube outlets to a second position in communication with a second transfer tube outlet.

9. The continuous feed system defined in claim 4, characterized in that said sensor means is located on said feed tube adjacent said feed selector valve and is adapted to sense the presence or absence of said self-attaching fasteners in said feed tube.

* * * * *

UNITED STATES PATENT AND TRADEMARK OFFICE
CERTIFICATE OF CORRECTION

PATENT NO.   : 5,299,351
DATED        : April 5, 1994
INVENTOR(S)  : Takahashi, Takao; Takehara, Hiroshi It is certified that error appears in the above-indentified patent and that said Letters Patent is hereby corrected as shown below:

Column 10, line 13, delete "claim 19," and insert --claim 7,--

Signed and Sealed this

Twenty-sixth Day of July, 1994

Attest:

BRUCE LEHMAN

*Attesting Officer*     Commissioner of Patents and Trademarks